United States Patent
Hoshino et al.

(10) Patent No.: US 9,241,334 B2
(45) Date of Patent: Jan. 19, 2016

(54) WIRELESS RECEPTION DEVICE, WIRELESS TRANSMISSION DEVICE, AND WIRELESS COMMUNICATION METHOD

(75) Inventors: Masayuki Hoshino, Kanagawa (JP); Akihiko Nishio, Kanagawa (JP); Seigo Nakao, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 653 days.

(21) Appl. No.: 13/635,964

(22) PCT Filed: Mar. 8, 2011

(86) PCT No.: PCT/JP2011/001362
§ 371 (c)(1),
(2), (4) Date: Sep. 19, 2012

(87) PCT Pub. No.: WO2011/118141
PCT Pub. Date: Sep. 29, 2011

(65) Prior Publication Data
US 2013/0010750 A1    Jan. 10, 2013

(30) Foreign Application Priority Data
Mar. 26, 2010   (JP) ................................ 2010-072360

(51) Int. Cl.
| | |
|---|---|
| H04W 72/04 | (2009.01) |
| H04W 72/08 | (2009.01) |
| H04L 5/00 | (2006.01) |
| H04L 1/00 | (2006.01) |
| H04L 25/02 | (2006.01) |
| H04L 27/26 | (2006.01) |

(52) U.S. Cl.
CPC ........... *H04W 72/082* (2013.01); *H04L 1/0035* (2013.01); *H04L 5/0007* (2013.01); *H04L 5/0037* (2013.01); *H04L 1/0003* (2013.01); *H04L 1/0009* (2013.01); *H04L 25/0204* (2013.01); *H04L 27/2647* (2013.01); *H04W 72/0406* (2013.01)

(58) Field of Classification Search
None
See application file for complete search history.

(56) References Cited

U.S. PATENT DOCUMENTS

2009/0268630 A1* 10/2009 Yellin et al. ................... 370/252

OTHER PUBLICATIONS

International Search Report for PCT/JP2011/001362 dated May 17, 2011.

(Continued)

*Primary Examiner* — Alex Skripnikov
(74) *Attorney, Agent, or Firm* — Pearne & Gordon LLP

(57) ABSTRACT

A wireless reception device includes a resource information acquisition section that is configured to acquire silent resource setting information showing that a silent resource which indicates that no signals are allocated in a predetermined resource among distributed resources in which a resource unit defined in a frequency-time domain is divided along a time direction and distributed at a predetermined frequency interval, a receiver that is configured to receive a signal including the distributed resources in which the silent resource is allocated; and an inter-cell interference measurement section that is configured to measure an inter-cell interference pertaining to an amount of interference affected by another cell based on the silent resource setting information and by use of the silent resource allocated in the distributed resources.

13 Claims, 12 Drawing Sheets

(56) References Cited

OTHER PUBLICATIONS

R1-101214, 3GPP TSG RAN WG1 Meeting #60, San Francisco, USA, Feb. 22-26, 2010, NTT DOCOMO, "CSI-RS Design for LTE-Advanced".

R1-100048, 3GPP TSG-RAN WG1 #59bis, Valencia, Spain, Jan. 18-22, 2010, Ericsson, ST-Ericsson, "On CSI RS Design".

R1-081818, 3GPP TSG RAN WG1 #53, Kansas City, USA, May 5-9, 2008, LG Electronics, Panasonic, Motorola, Nortel, Ericsson, NEC, "Introduction of CR for downlink DVRB mapping to PRB".

R1-074361, 3GPP TSG RAN WG1 Meeting #50bis, Shanghai, China, Oct. 8-12, 2007, Mitsubishi Electric, "Distributed VRB mapping over 3 PRBs".

* cited by examiner

FIG. 8

| DVRB-ID | #0 | #1 | #2 | #3 | #4 | #5 | #6 | #7 | #8 | #9 | #10 | ... | #$\tilde{N}_{VRB}^{DL}-2$ | #$\tilde{N}_{VRB}^{DL}-1$ |
|---|---|---|---|---|---|---|---|---|---|---|---|---|---|---|
| SILENT RESOURCE ALLOCATION | 1 | 1 | 0 | 0 | 0 | 0 | 0 | 0 | 1 | 1 | 0 | ... | 0 | 0 |

*FIG. 10*

| DVRB-ID | #0 | #1 | #2 | #3 | ... | #J/$N_{col}$ | ... | #($N_{VRB}^{DL}$/$N_{col}$)−2 | #($N_{VRB}^{DL}$/$N_{col}$)−1 |
|---|---|---|---|---|---|---|---|---|---|
| SILENT RESOURCE ALLOCATION | 1 | 0 | 0 | 0 | ... | 1 | ... | 0 | 0 |

WIRELESS RECEPTION DEVICE, WIRELESS TRANSMISSION DEVICE, AND WIRELESS COMMUNICATION METHOD

TECHNICAL FIELD

The present invention relates to a wireless reception device, a wireless transmission device, and a wireless communication method applicable to a wireless communication system such as a cellular system.

BACKGROUND ART

In relation to a wireless communication system, such as a cellular system, improvement of frequency use efficiency for an OFDM (Orthogonal Frequency Division Multiplexing) scheme has been studied. Specifically, the improvement is achieved by applying adaptive modulation or frequency scheduling to each of resource blocks into which a plurality of sub-carriers are bundled. Adaptive modulation is a scheme for determining a coding rate and a modulation scheme so as to satisfy a predetermined packet error ratio depending on a state of a propagation path observed by a receiving side. The scheme is also called adaptive MCS (Modulation and Coding Scheme) control. Further, frequency scheduling is achieved through the following operation. Namely, a plurality of mobile stations of a wireless communication system report states of propagation paths in respective resource blocks observed by receiving sides. A base station collects the states of the propagation paths and allocates favorable resource blocks to the respective mobile stations according to a predetermined scheduling algorithm. A value of a report on a state of a propagation path used for adaptive modulation or frequency scheduling is called channel information, i.e., Channel State Information (CSI).

In order for the CSI report, a reference signal used for acquiring various indices of a propagation path or a transmission signal is introduced into the wireless communication system, such as a cellular system. FIG. 11 is an explanatory operation diagram schematically showing CSI reporting operation performed when adaptive modulation and frequency scheduling are carried out. A reference signal is transmitted from a base station (nodeB) that is a transmission device to terminals (UE A, UE B) that are reception devices, and a CSI report is transmitted from each of the terminals to the base station. The base station performs adaptive modulation and frequency scheduling based on a reported CSI from each of the terminals, and then allocates terminals to respective resource blocks and determines a coding rate and a modulation scheme.

For instance, a reference signal (Reference Signal: RS) is employed for LTE (Long Term Evolution) of a next generation communication system discussed by the 3GPP (3rd Generation Partnership Project) that is an international standard setting organization of mobile communication. During downlink communication from the base station to the terminal, a reference signal to be transmitted from a transmission device (the base station) to a reception device (the terminal) is used primarily in use applications; for instance, (1) estimating a propagation path for demodulation purpose and (2) measuring quality of adaptive modulation or frequency scheduling. In LTE, a multi antenna system to which MIMO (Multiple Input Multiple Output) is to be applied transmits a reference signal in units of predetermined wireless resources. In LTE-advanced (hereinafter called "LTE-A") that is a communication system resultant of further advancement of LTE, introduction of high-order MIMO (employing; e.g., eight transmission antennas), coordinated multipoint (CoMP) transmission/reception, and the like, have been discussed to achieve further advancement. In order to address upgrading of frequency use efficiency, such as that mentioned above, there is required measuring a state of a propagation path with a higher degree of accuracy.

In addition to the channel information (CSI), inter-cell interference is mentioned as another factor that contributes to control of adaptive modulation or frequency scheduling. Specifically, whether or not the reception device can detect and demodulate a signal without failure by means of a resource block allocated a transmission device, a coding rate, and a modulation scheme depends on intensity of a desired signal against noise and interference; namely, an SINR (Signal-to-Interference plus Noise Ratio). Therefore, it is desirable that the reception device should measure inter-cell interference affected by other cells and should report intensity of a desired signal against the inter-cell interference as channel information. Incidentally, other cell signals that actually interfere with the desired signal fluctuate according to states of allocation of data to other cells.

FIG. 12 is an explanatory operation diagram schematically showing inter-cell interference and a status of traffic with other cells. When a signal is transmitted from a base station (nodeB) that is a transmission device to a terminal (UE A) that is a reception device, the terminal (UE A) receives, as an interference signal, a signal originated from a base station (Interfering nodeB) for another cell in place of a desired signal to be acquired. When the terminal observes an interference signal (another cell signal) from another cell in order to measure inter-cell interference, there mixedly exist a case where data are allocated (white blocks in the drawing) and another case where data are not allocated (hatched blocks in the drawing) depending on observation timing and a frequency resource to be observed. In ordinary operation, a terminal does not have any means for grasping control information about allocation of data to another cell; hence, the terminal cannot ascertain a state of allocation of another cell signal. An averaging procedure over a long time and a wide range is mentioned as means that enable easing of influence caused by a change in state of data allocation.

CITATION LIST

Non-Patent Literature

Non-Patent Literature 1; 3GPP TSG RAN WG1 #59bis, R1-100048, Ericsson, ST-Ericsson, "On CSI RS Design," January, 2010

SUMMARY OF INVENTION

Technical Problem

On the occasion of measurement of inter-cell interference, there is available operation for taking as silence signals specific resources of a base station that transmits a desired signal, lessening a component which will interfere with another cell signal that is a measurement target, and letting the terminal receive the silence signals (see Non-Patent Literature 1). A silence signal resource that takes a specific resource as a silence signal is called a muting or silent resource. FIG. 13 is shows an example allocation of silence signal resources. An illustrated example shows an example case where the silence signal resources described in connection with Non-Patent Literature 1 are applied to allocation of LTE resources. In LTE, the minimum unit of adaptive modulation and frequency scheduling is defined as a resource block (Resource Block: RB, and hereinafter called "RB") in a frequency direction and also as a sub-frame (subframe) in a time direction. One sub-frame and RB that act as a resource unit are called one RB/Sub-frame. The one RB/Sub-frame is made up of 12 subcarriers in the frequency direction and 14 OFDM symbols in the time direction. A unit of the OFDM symbol and the subcarrier is called an RE (Resource element). As indicated in a frame where RB12 of Sub-frame #0 in the drawing is enlarged, there is employed, as a configuration of a signal in one RB/Sub-frame, a configuration where a control signal is allocated at a head of the time axis and followed by data and where reference signals RS are allocated in respective predetermined resources REs. Some of data resources (data REs) are replaced with silent resources (silent REs). The reference signal RSs and the silent REs are allocated in specific REs (specific OFDM symbols and subcarriers) in one RB/Sub-frame. Further, such an RB/Sub-frame having the silent REs is allocated at predetermined intervals along the frequency direction and the time direction. In the illustrated example, the RB/Sub-frame having the silent RE is allocated at every third in the frequency direction and every other in the time direction.

As shown in FIG. 13, when a silent resource is allocated to the specific RB/Sub-frame, an interval at which an RB/sub-frame having a silent RE is allocated must be reduced in order to achieve an averaging effect during measurement of inter-cell interference performed by the reception device. However, when an interval at which the silent resources are allocated is reduced, a problem of a reduction in throughput arises. Since performance of a legacy terminal (an LTE terminal in this case) conforming to the existing system may undergo adverse influence from newly added resources (the silent resources). Therefore, it is hard to allocate a legacy terminal to a resource having the silent RE. Consequently, the base station is subjected to restrictions in terms of terminal scheduling.

The present invention has been conceived in light of the circumstances and aims at enabling avoidance of restrictions on scheduling, which would otherwise be caused by silent resources when the silent resources are allocated to measure inter-cell interface.

Solution to Problem

The present invention serves as a wireless reception device, including: a resource information acquisition section that is configured to acquire silent resource setting information showing that a silent resource which indicates that no signals are allocated in a predetermined resource among distributed resources in which a resource unit defined in a frequency-time domain is divided along a time direction and distributed at a predetermined frequency interval; a receiver that is configured to receive a signal including the distributed resources in which the silent resource is allocated; and an inter-cell interference measurement section that is configured to measure an inter-cell interference pertaining to an amount of interference affected by another cell based on the silent resource setting information and by use of the silent resource allocated in the distributed resources.

The present invention also serves as a wireless transmission device, including: a resource setting section that is configured to perform a resource setting so as to allocate a silent resource which indicates that no signals are allocated in a predetermined resource among distributed resources in which a resource unit defined in a frequency-time domain is divided along a time direction and distributed at a predetermined frequency interval, and to generate silent resource setting information showing an allocation of the silent resource; and a transmitter that is configured to transmit a signal including the distributed resources in which the silent resource is allocated and the silent resource setting information.

The present invention serves as a wireless communication method, including: acquiring silent resource setting information showing that a silent resource which indicates that no signals are allocated in a predetermined resource among distributed resources in which a resource unit defined in a frequency-time domain is divided along a time direction and distributed at a predetermined frequency interval; receiving a signal including the distributed resources in which the silent resource is allocated; and measuring an inter-cell interference pertaining to an amount of interference affected by another cell based on the silent resource setting information and by use of the silent resource allocated in the distributed resources.

The present invention serves as a wireless communication method, including: performing a resource setting so as to allocate a silent resource which indicates that no signals are allocated in a predetermined resource among distributed resources in which a resource unit defined in a frequency-time domain is divided along a time direction and distributed at a predetermined frequency interval, and generating silent resource setting information showing an allocation of the silent resource; and transmitting a signal including the distributed resources in which the silent resource is allocated and the silent resource setting information.

According to the configuration, when silent resources for measuring inter-cell interference are allocated, the silent resources are allocated by utilization of distributed resources, resources where silent resources are to be allocated can be limited to specific resources. For this reason, for instance, resources that will affect a legacy terminal compatible with an existing system can be minimized. When the silent resources are allocated, restrictions on scheduling of the legacy terminal can be curtailed.

Advantageous Effects of Invention

When silent resources are allocated to measure inter-cell interference, the present invention makes it possible to avoid restrictions on scheduling, which would otherwise be caused by the silent resources.

BRIEF DESCRIPTION OF DRAWINGS

FIG. 8 is a diagram showing an example bitmap for reporting a silent resource allocation DVRB ID of the third embodiment.

FIG. 10 is a diagram showing an example bitmap for reporting a silent resource allocation DVRB ID in the fourth embodiment.

MODES FOR CARRYING OUT INVENTION

Figure 1:
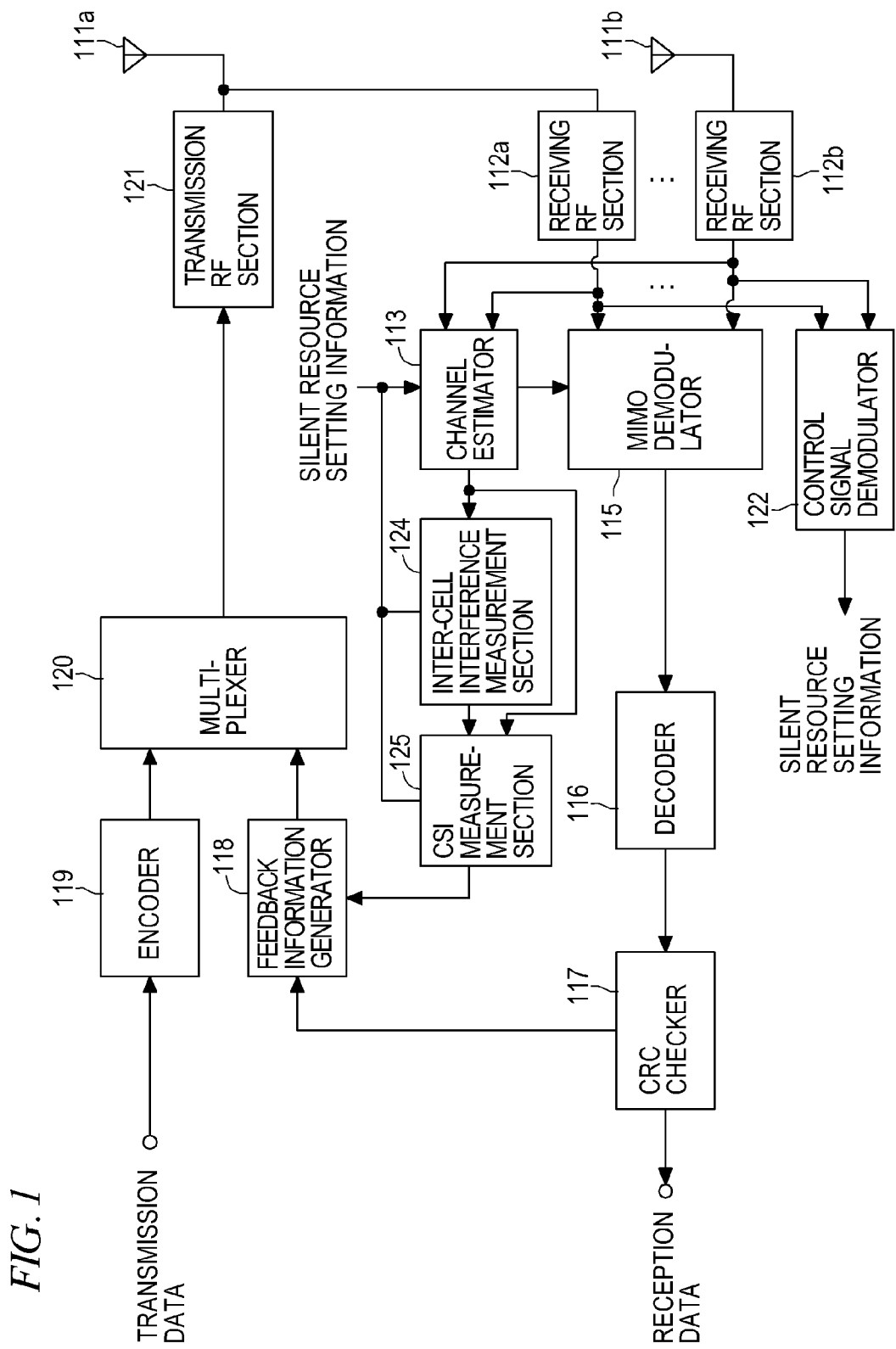
FIG. 1 is a block diagram showing a configuration of a principal block of a reception device used in embodiments of the present invention.

Embodiments show examples in which a wireless reception device, a wireless transmission device, and a wireless communication method of the present invention are applied to a mobile communication cellular system, such as cellular phones system. Exemplified herein are cases where MIMO-based communication is carried out in a wireless communication system in which a base station (BS: Base Station) works as a wireless transmission device and in which a terminal of a mobile station (UE: User Equipment) works as a wireless reception device. The base station is assumed to establish communication with an LTE-compliant terminal that is a first communication system and an LTE-A-compliant terminal that is a second communication system. The base station, at this time, sends to the terminals a reference signal for performing adaptive modulation or frequency scheduling. Moreover, in order to measure inter-cell interference, a silent resource is presumed to be allocated to a specific resource.

(First Embodiment)

As described in connection with the background art, RB/Sub-frame that is a resource unit made up of an RB defined in a frequency direction and a Sub-frame defined in a time direction is used in LTE as a plurality of resources defined within a frequency-time domain. In this LTE frame structure, adaptive modulation and frequency scheduling are carried out while the RB/Sub-frame is taken as the minimum unit. Distributed resources are employed in the present embodiment. Specifically, one physical RB/Sub-frame is divided into a first half slot and a last half slot in the time direction. Resources of one logical RB/Sub-frame unit are caused to be hopped between the first half slot and the last half slot along the frequency direction, thereby discretely locating the resources into two different physical RB/Sub-frames at a predetermined frequency interval; namely, distributing the resources. In LTE, distributed resources, such as those mentioned above, are called distributed resources (DVRB: Distributed Virtual RB and hereinafter called "DVRB resources"). By utilization of an allocation of the DVRB resources, silent resources are allocated to only portions of the DVRB resources; for instance, two of four DVRB resources. Silent resources RE are allocated in slots of the DVRB resources, and the signals are transmitted. Here, silent resources are resources by means of which no signals are actually transmitted. Resources RE for the silent resources have their data punctured. For more information about the DVRB, refer to the following cited Non-Patent Literature A.

Cited Non-Patent Literature A: 3GPP TSG RAN WG1 #53, R1-081818, LG Electronics, Panasonic, Motorola, Nortel, Ericsson, NEC, "Introduction of CR for downlink DVRB mapping to PRB," May, 2008

In a specific RB/sub-frame to be allocated silent resources, a silent resource RE is allocated in a first half slot or a last half slot. The silent resource RE comes to be present in only portions of the resources of one physical RB/Sub-frame. A specific example of a silent resource allocation method of the present embodiment will be described in detail later.

By adoption of the silent resource allocation method, resources that affect LTE terminals compliant with only LTE can be minimized, whereby throughput degradation can be prevented. More specifically, in relation to degradation of demodulation performance of the LTE terminal, a resource where a silent resource is to be allocated can be limited to a specified DVRB resource. Hence, influence of puncture of a data block which will be imposed by the silent RE is prevented by allocating data for an LTE terminal to a resource other than the resource, so that degradation of demodulation performance can be suppressed. Further, in relation to restrictions on scheduling, the LTE terminal is covered by use of the DVRB resource. As a result, there exists a slot having DVRB resources where a silent resource RE is not present in all physical RB/Sub-frames. Further, the LTE terminal can be allocated to the slot; hence, the restrictions on scheduling can be curtailed. As above, according to the present embodiment, degradation of demodulation performance and restrictions on the scheduler, which would otherwise be caused by allocation of a silent resource to measure inter-cell interference, can be avoided, so that throughput degradation can be prevented. This enables measurement of inter-cell interference with superior accuracy, and CSI reporting with a higher degree of accuracy becomes feasible. Therefore, coordinated multi-point transmission/reception, or the like, of a cellular system becomes practical by means of superior characteristics.

A specific example configuration of the reception device and the transmission device of the wireless communication system of the embodiment is now described.

Figure 2:
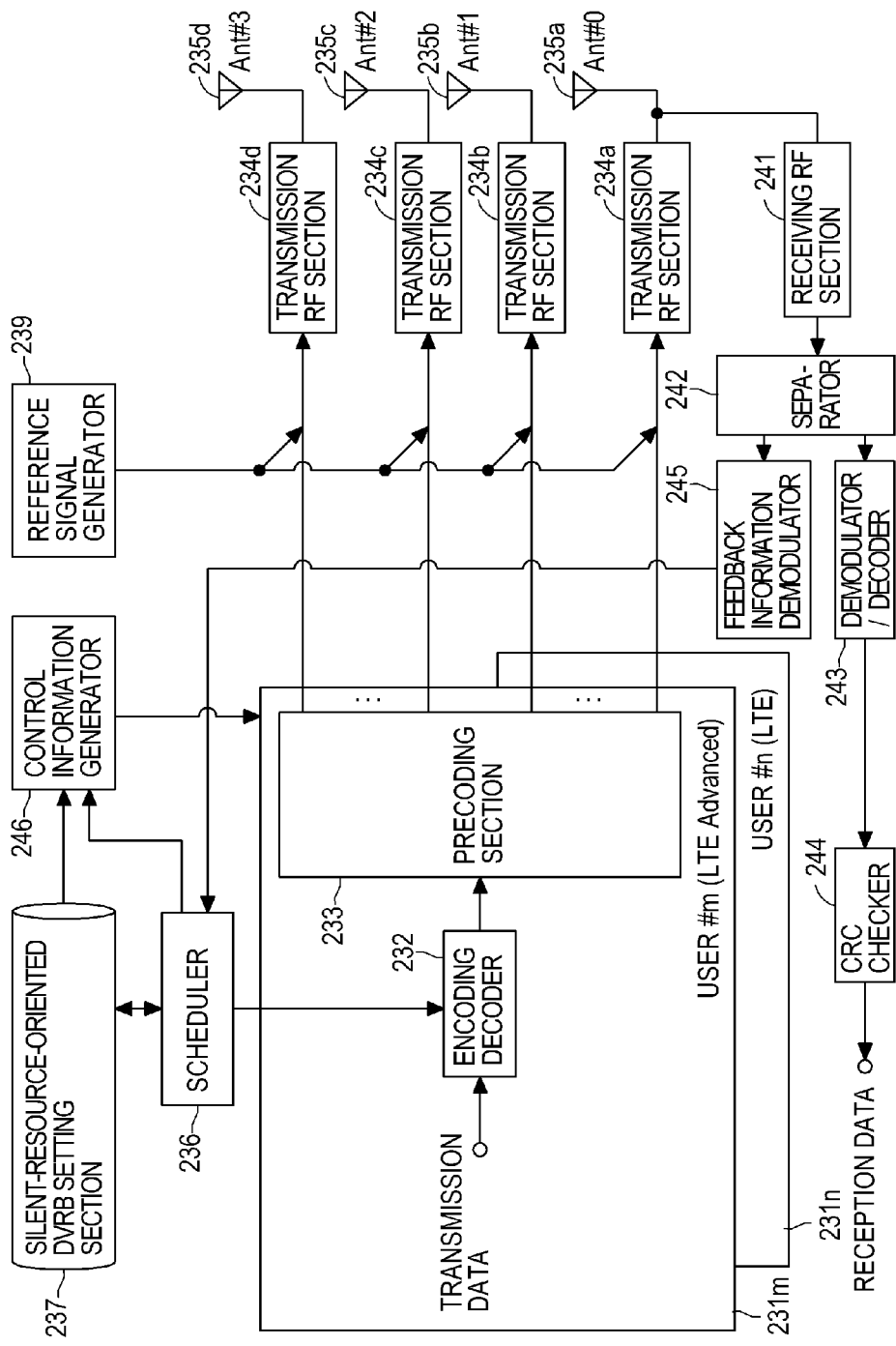
FIG. 2 is a block diagram showing a configuration of a principal block of a transmission device used in the embodiments of the present invention.

FIG. 1 is a block diagram showing a configuration of a principal block of the reception device used in the embodiment of the present invention, and FIG. 2 is a block diagram showing a configuration of a principal block of the transmission device used in the embodiment of the present invention.

The present embodiment is based on the supposition that wireless communication is established between the reception device shown in FIG. 1 and the transmission device shown in FIG. 2 by use of radio waves. In the embodiment, the transmission device (a wireless transmission device) shown in FIG. 2 is assumed to be applied to a wireless communication base station device (a base station or BS) of the cellular system. Further, the reception device (a wireless reception device) shown in FIG. 1 is assumed to be applied to a terminal (UE) that is a wireless communication mobile station device, such as a cellular phone. The present embodiment is based on the premise that a MIMO system which performs wireless transmission and reception by use of a plurality antennas for both transmission and reception is built, that the transmission device can establish transmission with a plurality of respective reception devices, and that a transmission side performs precoding transmission involving allocating weights to a plurality of antennas, respectively. An assumed format of a communication signal is achieved when communication is performed by means of a multicarrier communication scheme; for instance, an OFDM signal. An exemplified specific example is a case where a base station acting as a transmission device establishes communications with an LTE-compliant LTE terminal serving as a reception device and an LTE-A-compliant LTE-A terminal.

The reception device shown in FIG. 1 is equipped with a plurality of antennas 111a and 111b; a plurality of receiving RF sections 112a and 112b; a channel estimator 113; a MIMO demodulator 115; a decoder 116; a CRC checker 117; an inter-cell interference measurement section 124; a CSI measurement section 125; a feedback information generator 118; an encoder 119; a multiplexer 120; a transmission RF section 121; and a control signal demodulator 122.

The plurality of independent antennas 111a and 111b receive radio waves transmitted from a device on the other side (e.g., a transmission device shown in FIG. 2). After being transformed by the receiving RF section 112a into a comparatively low frequency signal, such as a baseband signal, processing, such as Fourier transform or parallel-to-serial conversion is performed on a high-frequency signal of the radio wave received by the antenna 111a, to thus be converted into a reception signal of serial data. Likewise, after being transformed by the receiving RF section 112b into a comparatively low frequency signal, such as a baseband signal, processing, such as Fourier transform or parallel-to-serial conversion is performed on a high frequency signal of the radio wave received by the antenna 111b, to thus be converted into a reception signal of serial data. Outputs from the receiving RF sections 112a and 112b are input to the channel estimator 113, the MIMO demodulator 115, and the control signal demodulator 122.

The channel estimator 113 estimates a channel based on a reference signal included in the signals transmitted from the respective transmission antennas of the device on the other side (the transmission device), and calculates a channel estimate value. On this occasion, the reception device localizes a silent resource based on control information separately reported by the transmission device. Specifically, an ID and a transmission sub-frame of a DVRB resource are reported by means of control information transmitted from the transmission device (the base station) to the reception device (the terminal). The channel estimator 113 receives inputs of silent resource setting information as distributed resource information about the silent resource based on the control information, thereby acquiring the ID and the transmission sub-frame of the DVRB resource to which the silent resource is to be allocated. Although information about settings of the DVRB for the silent resource; namely, a DVRB hopping method and a transmission sub-frame interval, will be described in detail later, a DVRB resource allocation and a method for reporting a DVRB resource, which are descried in connection with the cited Non-Patent Literature A, are utilized. On the assumption that the silent resource is allocated in a predetermined OFDM symbol of the resource or a sub-carrier, the channel estimator 113 performs channel estimation processing by means of a reference signal RS for channel quality measurement purpose. The control signal demodulator 122 demodulates a control signal transmitted from the base station, thereby extracting and acquiring silent resource setting information pertaining to settings of the DVRB for a silent resource and control information such as transmission parameters including MCS information, such as a modulation scheme and a coding rate of a transmission signal. The control signal demodulator 122 previously receives and demodulates setting information about a silent resource, retaining the thus demodulated setting information. The channel estimation value calculated by the channel estimator 113 is input to the inter-cell interference measurement section 124, the CSI measurement section 125, and the MIMO demodulator 115.

Like the channel estimator 113, the inter-cell interference measurement section 124 specifies a frequency of the DVRB resource where the silent resource is allocated (an ID of the DVRB resource) and a time interval (a transmission sub-frame interval) based on the control information separately reported from the transmission device. Averaging and interpolation are performed on the channel estimation value for the resource sent from the channel estimator 113, thereby calculating inter-cell interference. Specifically, a value of inter-cell interference showing an amount of interference from another cell is calculated according to an allocation of silent resources. Based on an output from the channel estimator 113 and an output from the inter-cell interference measurement section 124, the CSI measurement section 125 calculates channel quality information CSI by use of a received value of the reference signal RS transmitted from the transmission device and a calculated value of inter-cell interference, in the same manner as described in connection with Non-Patent Literature 1. Specific channel quality information CSI includes CQI (Channel Quality Indicator) conforming to a combination of an existing modulation scheme with a coding rate, a PMI (Precoding Matrix Indictor) for selecting a precoding matrix conforming to a current channel status from an existing code book, an RI (Rank Indicator) conforming to the number of desired transmission streams, and the like. The channel quality information CSI is input to the feedback information generator 118.

The MIMO demodulator 115 performs processing for demodulating a reception signal conforming to a device of its own (i.e., the reception device of its own) by use of the channel estimate value received from the channel estimator 113 and outputs the thus demodulated signal to the decoder 116. De-interleaving, rate-dematching, likelihood combination processing, and the like, are performed at this time. The decoder 116 decodes the signal input from the MIMO demodulator 115, thereby reconstructing the reception data. On this occasion, error correction decoding is performed on a MIMO-separated signal being received from the MIMO demodulator 115, and a resultant signal is output to the CRC checker 117. The CRC checker 117 performs error detection processing on the decoded signal output from the decoder 116 through CRC (Cyclic Redundancy Check) and outputs data error presence/absence information showing whether or not the decoded reception data include an error to the feedback information generator 118. The reception data are output from the CRC checker 117.

The feedback information generator 118 generates feedback information including channel quality information CSI (CQI, PMI, RI, and the like) generated by the CSI measurement section 125. Based on a result of error detection performed by the CRC checker 117, the feedback information generator 118 determines whether or not the decoded reception data include an error and generates Ack/Nack information. When an error is not included in a decoding result, Ack (Acknowledgement) information is generated. When a decoding result includes an error, Nack (Negative Acknowledgement) information is generated.

The encoder 119 encodes transmission data, and outputs the thus encoded transmission data to the multiplexer 120. The multiplexer 120 multiplexes a transmission signal including the input feedback information and the encoded transmission data, and the like. Rate matching, interleaving, modulation processing, and the like are performed on the transmission signal, for adaptively setting a modulated multi-value number and a coding rate, and a processing result is output to the transmission RF section 121. In the transmission RF section 121, the input is converted into a high frequency signal of a given radio frequency band after undergoing serial-to-parallel conversion, inverse Fourier transformation, or the like. Further, after power amplification, the high frequency signal is transmitted as a radio wave from the antenna 111a. The feedback information transmitted from the reception device, such as the channel quality information CSI and the Ack/Nack information, is transmitted as a feedback signal and reported to the transmission device.

In the above configuration, the control signal demodulator 122 materializes a function of a resource information acquisition section. The receiving RF sections 112a and 112b and the MIMO demodulator 115 materialize the function of a receiver. The inter-cell interference measurement section 124 materializes a function of an inter-cell interference measurement section. The channel estimator 113 and the CSI measurement section 125 materialize a function of a channel quality measurement section. The feedback information generator 118, the multiplexer 120, and the transmission RF section 121 materialize a function of a feedback information transmitter.

In the meantime, the transmission device shown in FIG. 2 is equipped with a plurality of terminal-oriented signal processing units 231m, 231n; an encoder/modulator 232; a precoding section 233; a plurality of transmission RF sections 234a to 234d; a plurality of antennas 235a to 235d; a scheduler 236; a silent-resource-oriented DVRB setting section 237; a reference signal generator 239; a receiving RF section 241; a separator 242; a demodulator/decoder 243; a CRC checker 244; a feedback information demodulator 245; and a control information generator 246.

A radio wave transmitted from a device on the other side (e.g., the reception device shown in FIG. 1) is received by the antenna 235a. After being converted by the receiving RF section 241 into a signal of a comparatively low frequency band, such as a baseband signal, a high frequency signal of the radio wave received by the antenna 235a is input to the separator 242. The separator 242 separates a feedback signal from the reception signal, outputs the feedback signal to the feedback information demodulator 245, and also outputs another reception signal to the demodulator/decoder 243. The feedback information demodulator 245 demodulates the channel quality information, the Ack/Nack information, and the like, included in the feedback signal, and the thus demodulated information is input to the scheduler 236. Based on the channel quality information CSI reported from the reception device, the scheduler 236 performs at least one of frequency scheduling and adaptive modulation as scheduling pertaining to a transmission signal.

The demodulator/decoder 243 demodulates and decodes the reception signal separated by the separator 242, thereby reconstructing the reception data. The CRC checker 244 performs error detection processing involving CRC inspection on a decoded signal output from the demodulator/decoder 243, thereby determining whether or not the decoded reception data include an error. The CRC checker 244 outputs reception data.

The terminal-oriented signal processing units 231m and 231n perform signal processing of transmission signals compliant with respective user terminals, such as an LTE-A terminal and an LTE terminal. Each of the terminal-oriented signal processing units 231m and 231n has the encoder/modulator 232 and the precoding section 233. The encoder/modulator 232 performs encoding of transmission data and multiplexing, rate matching, interleaving, modulation processing, or the like, of a control signal, and outputs a processing result to the precoding section 233. The precoding section 233 gives a weight to each of transmission signals to be output to the plurality of antennas in order to generate a beam of transmitter pulse, and outputs the thus weighted transmission signals to the transmission RF sections 234a to 234d of the respective antennas.

After the transmission RF sections 234a to 234d perform serial-to-parallel conversion, inverse Fourier transformation, or the like on the respective transmission signals, the signals are converted into high frequency signals of predetermined radio frequency bands. After power amplification, the high frequency signals are transmitted as radio waves from the respective antennas 235a to 235d. The transmission signal from the transmission device is transmitted as a pilot channel including a reference signal, or the like, a control signal, and a data signal including various data, to the reception device. The pilot channel and the control signal are transmitted as a non-directional signal that does not form a beam. By means of precoding, the data signal is transmitted through a predetermined transmission channel as a directional signal that forms a predetermined beam.

The silent-resource-oriented DVRB setting section 237 reports silent-resource-oriented DVRB setting information to the scheduler 236 and the control information generator 246. The reference signal generator 239 generates a reference signal RS for use in measuring channel quality and places the reference signal RS in each of resources. By use of the received silent-resource-oriented DVRB setting information, the scheduler 236 performs allocation of the respective terminals. On this occasion, based on the ID and the transmission sub-frame of the DVRB resource corresponding to the DVRB setting information, allocation of the LTE terminal is performed by use of a resource not allocated the silent resource. The control information generator 246 generates a silent resource setting information from the DVRB setting information, generates control information including the silent resource setting information and information about allocation of resources to the respective terminals carried out through scheduling, and outputs the control information to the terminal signal processing units 231m and 231n. A control information generator transmits the control information to the reception device and separately reports the silent resource setting information to each of the terminals.

In the configuration, the silent-resource-oriented DVRB setting section 237 materializes a function of a resource setting section. The reference signal generator 239 materializes a function of a reference signal generator. Further, the terminal signal processing units 231m and 231n and the transmission RF sections 234a to 234d materialize a function of a transmitter. The receiving RF section 241, the separator 242, and the feedback information demodulator 245 materialize a function of a feedback information acquisition section. The scheduler 236 materializes a function of a scheduler.

Figure 3:
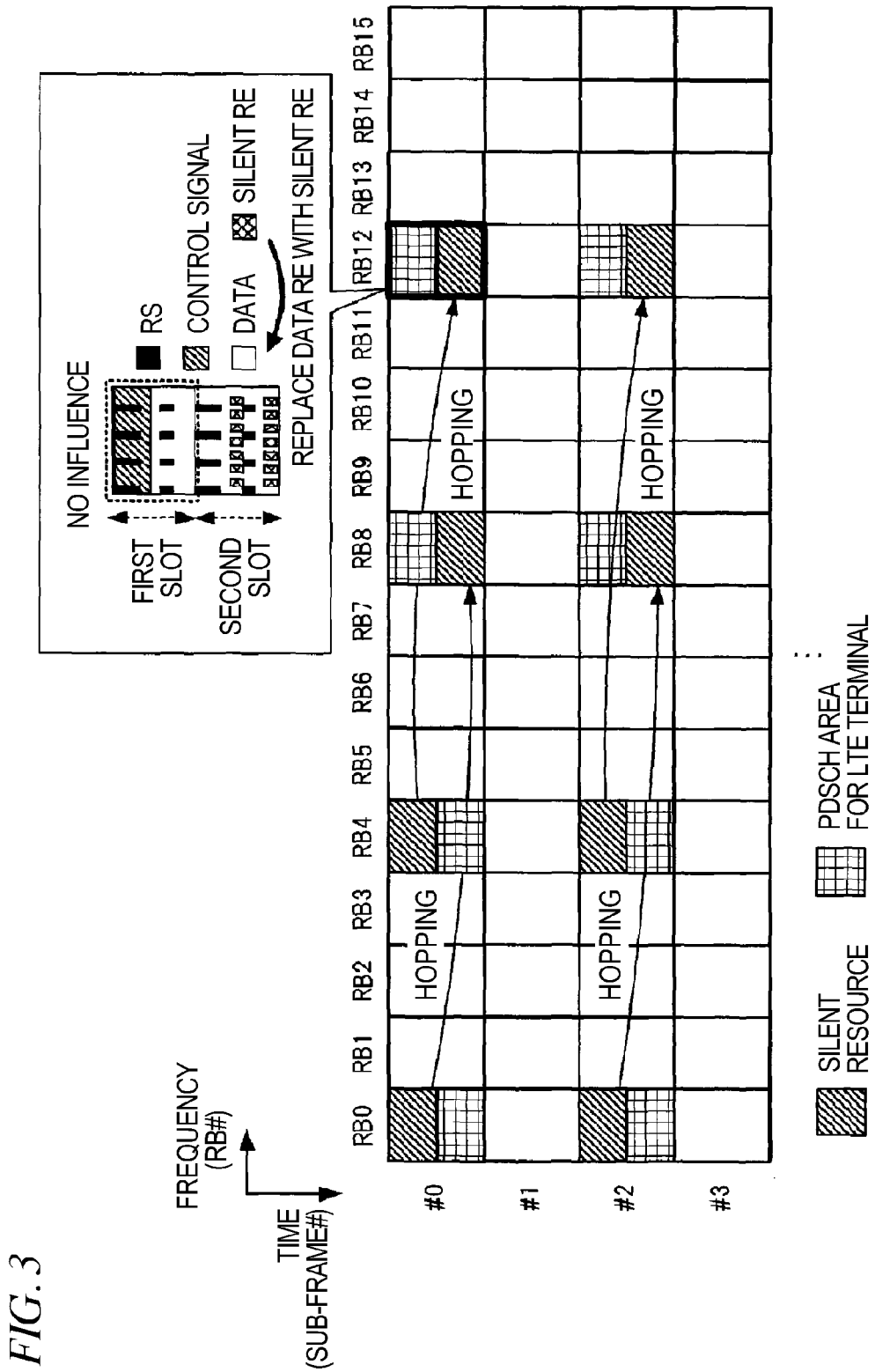
FIG. 3 is a diagram showing an allocation configuration of silent resources in the first embodiment.

The silent resource allocation method of the present embodiment is now described in detail. FIG. 3 is a diagram showing an allocation configuration of silent resources of the first embodiment, showing an example allocation of resources, for the reference signals RS, the control signals, data, and silent resources. In the first embodiment, resources corresponding to a first half slot (a first slot) of RB0 and a last half slot (a second slot) of RB8 (diagonally hatched blocks in the drawing) of DVRB resources of Sub-frame #0 of a transmission sub-frame are used for allocating silent resources. Illustrated is example allocation of an LTE terminal data area (a PDSCH area) to the last half slot of RB0 and the first half slot of RB8 (cross hatched blocks in the drawing), among the DVRB resources of the sub-frame. The same also applies to RB4 and RB12. The first half slot and the last half slot allocated to different RB/Sub-frames by hopping are defined by one resource ID (DVRB ID). The silent resources are allocated in Sub-frame #0, Sub-frame #2, and every other transmission sub-frame along the time direction.

The silent-resource-oriented DVRB setting section 237 sets DVRB resources, among the resources distributed at a predetermined frequency interval, in such a way that a silent resource is allocated in one slot (a diagonally hatched block in FIG. 3) in one RB/Sub-frame. Based on the settings of the DVRB resource, the scheduler 236 allocates LTE terminal data to another slot (a cross hatched block in FIG. 3) in relation to an RB/Sub-frame not allocated a silent resource or an RB/Sub-frame allocated a silent resource.

As illustrated in a frame of FIG. 3 that provides an enlarged view of RB12 of Sub-frame #0, RE (symbol sub-carrier) where a silent resource is allocated is positioned in a last half of the resource allocated to one RB/Sub-frame. RE of the data in the last half of the resource is replaced with a silent resource RE. Consequently, allocation of the silent RE is limited to one slot (the obliquely hatched block), and terminal data to be multiplexed with the other slot (the cross hatched block) can be transmitted without being affected by the silent resource. Resources of one RB/Sub-frame unit indicated by one RB in the drawing are assumed to have 12 sub-carriers in the frequency direction and 14 symbols in the time direction; namely, a total of 168 REs. The silent resources can be disposed by use of the DVRB resources. So long as one resource ID (RB0 or the like) of interest is reported as illustrated, silent resources can be allocated in two frequency domains that are widely separated from each other along the frequency direction. A hopping interval of DVRB is uniquely determined by a system bandwidth. The silent resource setting information reporting method for specifying the DVRB resource can be also reported as system information showing information for controlling an entire cell (System Information Block: SIB) or radio resource control information (Radio Resource Control: RRC) about an individual terminal.

Figure 4:
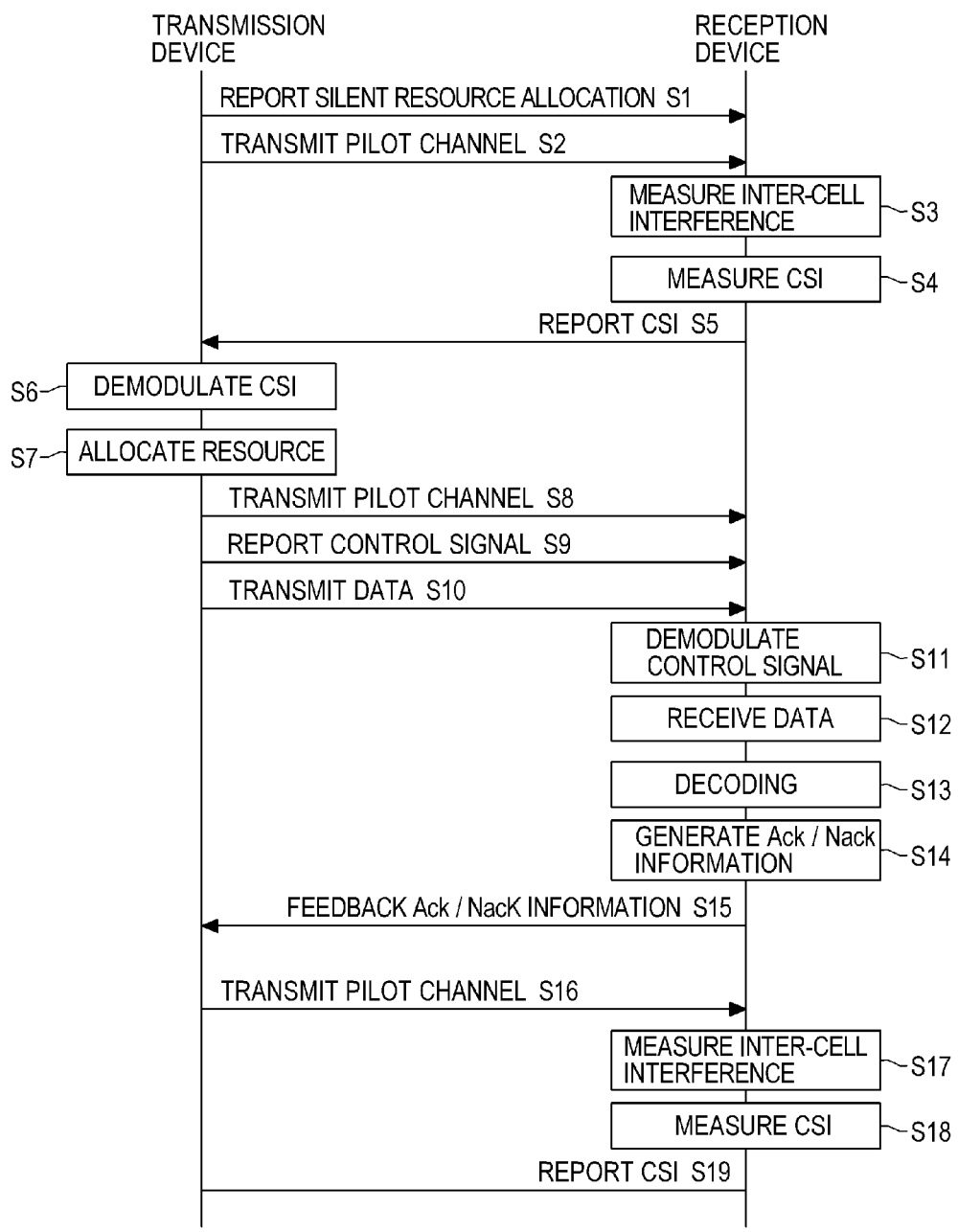
FIG. 4 is a sequence diagram schematically showing transmission of signals between a transmission device and a reception device and processing procedures of a wireless communication system including operation of each of the transmission device and the reception device in the present embodiment.

FIG. 4 is a sequence diagram schematically showing transmission of signals between the transmission device and the reception device and processing procedures of a wireless communication system including operation of each of the transmission device and the reception device of the present embodiment. First, the transmission device reports "silent resource allocation" as silent resource setting information to the reception device by means of control information (S1). The transmission device transmits RB/Sub-frame including the reference signal RS as a pilot channel to the reception device (S2). The reference signal RS and the silent resource can be also transmitted after being allocated to the same pilot channel or respectively to different channels (RB/Sub-frames). The reception device measures an inter-cell interference by the inter-cell interference measurement section 124 and by use of a corresponding silent resource (S3). Based on a result of measurement of the inter-cell interference, the CSI measurement section 125 measures channel quality information CSI by use of the pilot channel (S4). The reception device transmits and reports the thus measured channel quality information CSI to the transmission device (S5).

The transmission device demodulates the thus received channel quality information CSI (S6), executes adaptive modulation and frequency scheduling in accordance with specifics of the channel quality information, allocates terminals to respective RBs, and performs resource allocation, such as determination of a coding rate and a modulation scheme (S7). According to resource allocation, the transmission device transmits the data and a control signal including relative control information, along with the pilot channel (S8, S9, and S10).

Upon receipt of the respective signals transmitted from the transmission device, the reception device demodulates a control signal, to thus specify the resources and MCS used for transmitting data to the reception device itself (S11), and receives and decodes data (S12 and S13). Ack or Nack information is generated from a result of CRC inspection of the decoded data (S14). The thus generated Ack or Nack information is fed back to the transmission device (S15).

Processing pertaining to procedures subsequent to pilot channel transmission (S16 to S19) of the transmission device is arbitrarily, repeatedly executed. Data transmission is performed by means of adaptive modulation or frequency scheduling based on the inter-cell interference measured by the reception device and the channel quality information. In the above example, processing pertaining to steps S2 to S5, processing pertaining to steps S8 to S15, and processing pertaining to steps S16 to S19 correspond to the respective sub-frames. The silent resource setting information is assumed to be reported at a time interval (e.g., in several seconds) that is longer than a sub-frame interval (e.g., in several microseconds to several tens of microseconds).

In the present embodiment, the reception device measures inter-cell interference by use of a silent resource allocated in the DVRB resources previously reported by the silent resource setting information, to thus measure channel quality, and reports the thus measured channel quality to the transmission device. Further, the transmission device reports to the reception device the DVRB resources used for previously allocating the silent resources and receives a result of measurement of channel quality from the reception device. Adaptive modulation and frequency scheduling are implemented by use of the channel quality measurement result reported by the reception device.

The DVRB resources are divided into a first half slot and a last half slot and hopped in the frequency direction, whereby the resources are discretely allocated in different RB/Sub-frames. As a result of utilization of the allocation of the DVRB resources, the silent resources are allocated solely to DVRB resources having some IDs. In this case, a silent resource RE is allocated to a first half slot or a last half slot of a specific RB/sub-frame allocated a silent resource. The silent resource RE is allocated in only a portion of a resource of one physical RB/Sub-frame. Therefore, even when an interval at which RB/sub-frames having the silent resources RE are to be allocated is reduced in order to achieve an averaging effect during measurement of inter-cell interference performed by the reception device, a resource that affects a legacy terminal (an LTE terminal) compliant with the existing system can be minimized. On this occasion, it is hard to allocate the legacy terminal that may be susceptible to deterioration of receiving performance to a resource including the silent resource RE. However, slots of DVRB resources not including the silent resources RE are present in all of the physical RB/Sub-frames, and the legacy terminal can be allocated to the slot. Therefore, restrictions on scheduling can be curtailed. Since the allocation of silent resources RE is already known to an advanced terminal adaptive to the silent resources (i.e., the LTE-A terminal), appropriate data demodulation can be performed by exclusion of the silent resource RE. The legacy terminal is allocated to the slot of the DVRB resource not including the silent resource RE, thereby preventing influence of puncture of the data block, which would otherwise be caused by the silent resource RE, and degradation of demodulation performance. Degradation of a throughput of the wireless communication system can thereby be prevented.

The silent resource can be also allocated in only the last half slot of the first half slot and the last half slot of the DVRB resource. In LTE, a rate matched signal is allocated in an allocated resource from its head in accordance with a frequency first (a frequency first) rule. Specifically, in one RB/Sub-frame allocated resource, the rate matched signal is sequentially allocated in each of sub-carriers in the frequency direction from the systematic bit that is a yet-to-be-encoded data main body of encoded data with reference to a head OFDM symbol. Subsequently, processing returns to a head sub-carrier of the next OFDM symbol, and the signal is allocated in the frequency direction. The series of operations are iterated up to the final symbol. Therefore, a systematic bit, among the data to be transmitted, is allocated on a leading side of the allocated resource along the time axis, and a parity bit corresponding to redundant data to be added through encoding is allocated on a back side of the resource. Therefore, a higher probability of allocation of a parity bit comes to be achieved in the last half symbol of the resource. Accordingly, the silent resource is allocated to the last half slot, thereby making it possible to reduce a possibility of the systematic bit being punctured and the chance of occurrence of degradation of demodulation performance. Further, restrictions on scheduling can be also curtailed.

(Second Embodiment)

Figure 5:
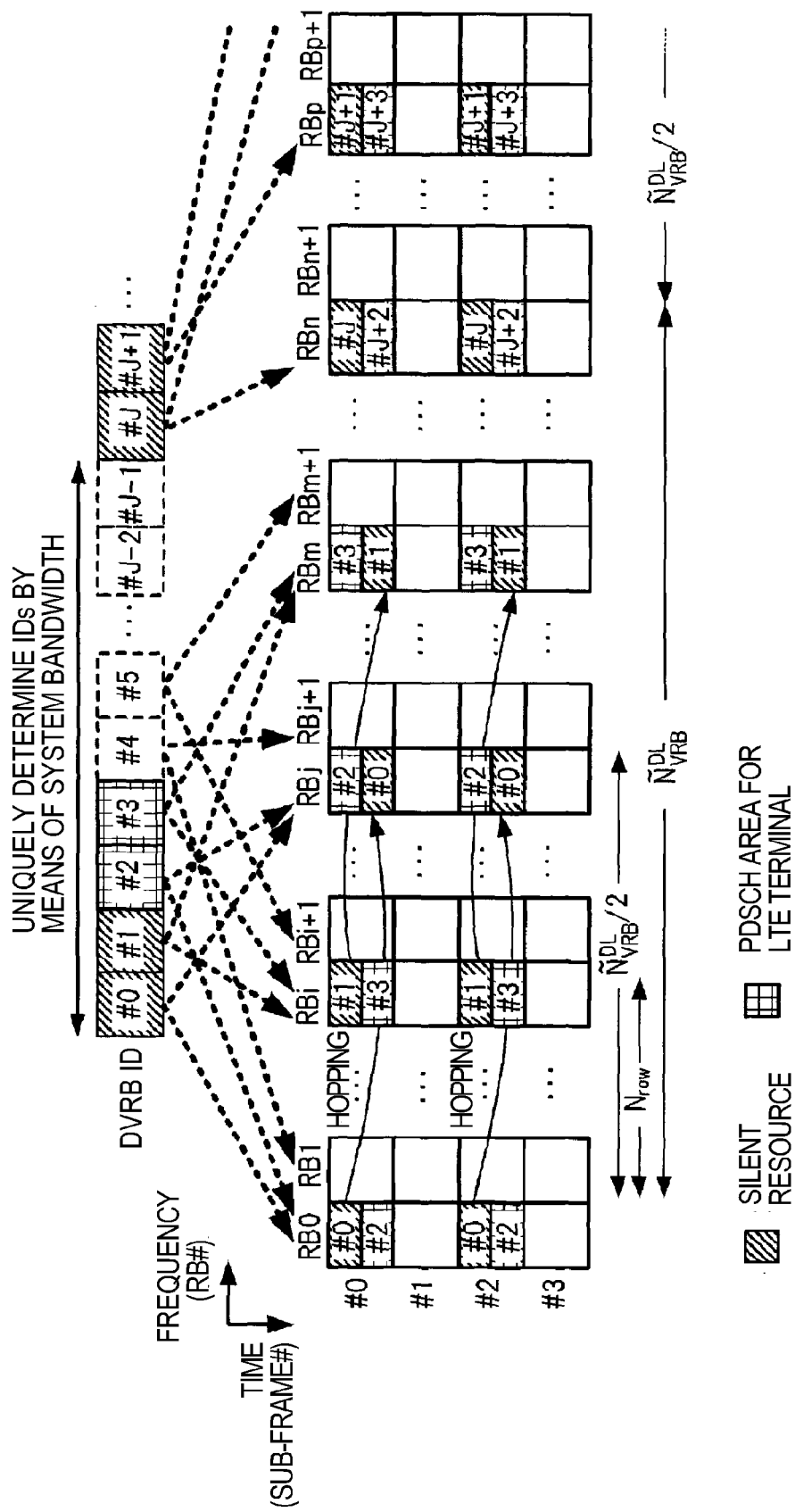
FIG. 5 is a diagram showing a configuration allocation of silent resources in a second embodiment.
Figure 6:
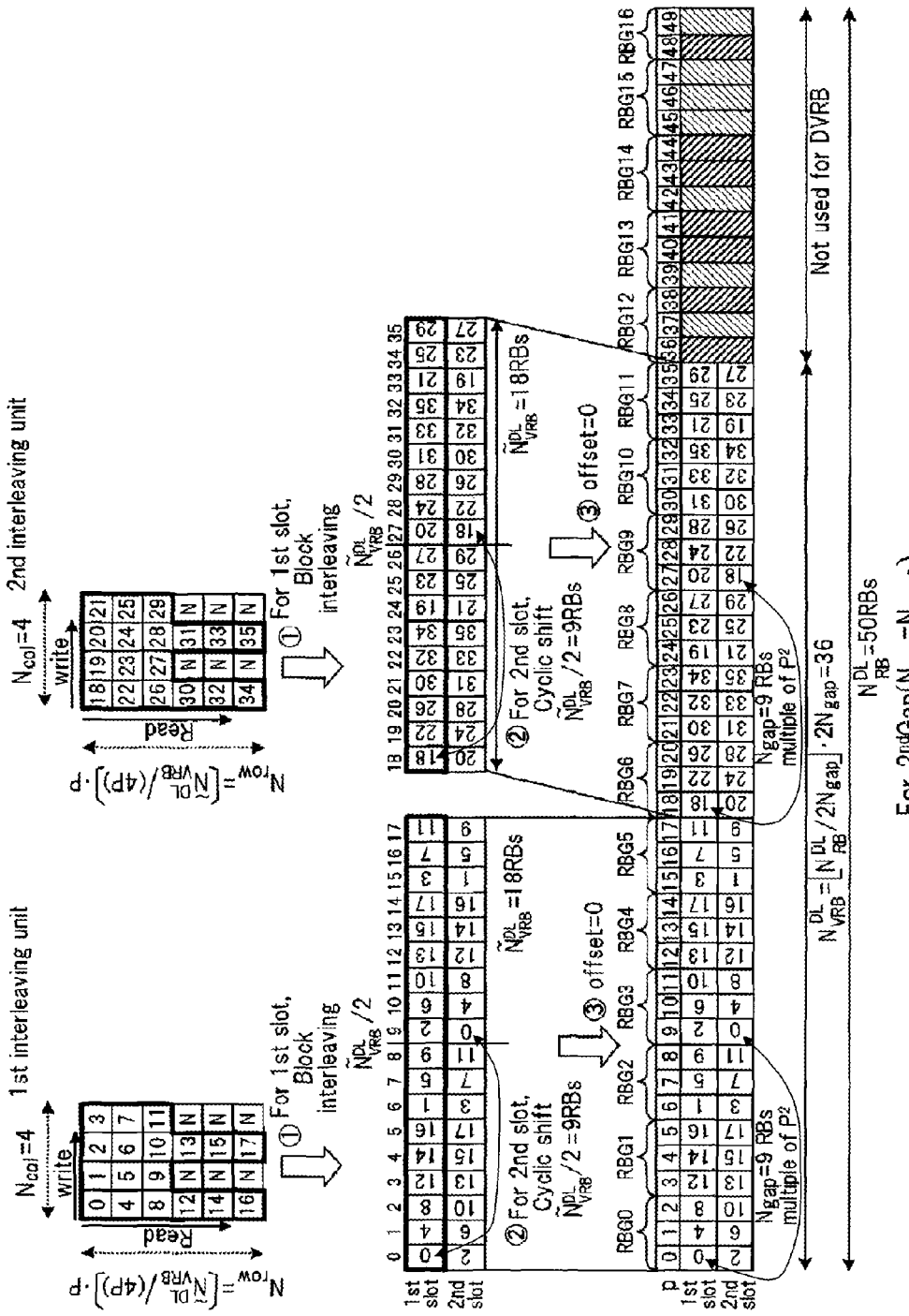
FIG. 6 is a diagram for explaining example allocation of DVRB resources.

In a second embodiment, there is shown an example modification of the silent resource allocation method described in the first embodiment. FIG. 5 is a diagram showing a configuration allocation of silent resources of the second embodiment. FIG. 6 is a diagram for explaining example allocation of DVRB resources.

The second embodiment is an example in which silent resources are allocated by repeated allocation of a DVRB resource at the system bandwidth in the same way as described in connection with Non-Patent Literature A. Specifically, the present embodiment is a resource allocation configuration in which the silent resource allocation of the first embodiment shown in FIG. 3 is repeated at the system bandwidth. FIG. 6 shows example allocation of the DVRB resource described in connection with Non-Patent Literature A. In order to accomplish an interpolation/averaging effect, the silent resource should preferably be allocated while distributed at an appropriate interval in such a way that the resources are not distributed at an excessive large interval. It is also more preferable that the silent resources be allocated over the entire system range.

For instance, silent resources are assumed to be allocated by use of resources corresponding to DVRB #0 and DVRB #1 among DVRB resource IDs (DVRB ID) allocated to the respective DVRB resources, and silent resources are assumed not to be allocated to DVRB #2 and DVRB #3. In this case, the first half slot and the last half slot of DVRB #0 are spaced apart from each other at an interval of $N^{-DL}_{VRB}/2$ in the frequency direction, and a slot of DVRB #0 and its counterpart slot of DVRB #1 are separated from each other at an interval of $N_{row}$ in the frequency direction. Reference symbol $N^{DL}_{VRB}$ designates the number of VRB (Virtual Resource Block) resources that are available as DVRB resources. Reference symbol $N^{-DL}_{VRB}$ (symbol ~ is actually prefixed to a position above N) designates a unit of the number of VRB resources employed at the time of interleaving of the DVRB resources. Further, reference symbol $N_{row}$ designates the number of VRB resources achieved in a row direction when the DVRB resources are interleaved by means of two dimensional rows and columns. The number of VRB resources $N_{col}$ achieved in the columnar direction is assumed to be four. In LTE, these values are fixed values that are uniquely determined according to a system bandwidth. For instance, in a 10-MHz system, $N^{-DL}_{VRB}$ can be limited to about 3.2 MHz that is one-half or less of the system band. When a resource located at a frequency position separated from DVRB #0 by $N^{-DL}_{VRB}$ is used for allocating a silent resource, a corresponding DVRB #J can be utilized. If a system has a system bandwidth of 10 MHz (the total number of RBs; namely, $N^{DL}_{RB}$, is 50), J=18 will be obtained in accordance with $N_{row}$=6 and $N^{-DL}_{VRB}$=18. In this case, $N^{DL}_{VRB}$=36, and allocation of 18 DVRB resources can be repeated twice. Although DVRB #2 and DVRB #3 are limited to DVRB transmission, frequency resources corresponding to DVRB #4 to DVRB #J-1 can be arbitrarily allocated. For instance, the terminals can be allocated as LVRB (Localized Virtual RB) that are continual allocation resources where resources are to be intensively allocated. Consequently, the LTE terminal can be allocated DVRB resources that are not allocated silent resources (e.g., DVRB #2 and DVRB #3 in FIG. 5) or LVRB resources. When a remainder arises as a result of the total number of RB resources $N^{DL}_{RB}$ being divided by a multiple of $N^{-DL}_{VRB}$, silent resources can be also allocated to RB resources of the remainder.

By means of the configuration using such a silent resource allocation method, the resources can be distributed at an appropriate interval over a wide area in the employed system bandwidth, so that an averaging effect yielded during measurement of inter-cell interference can be enhanced.

(Third Embodiment)

Figure 7:
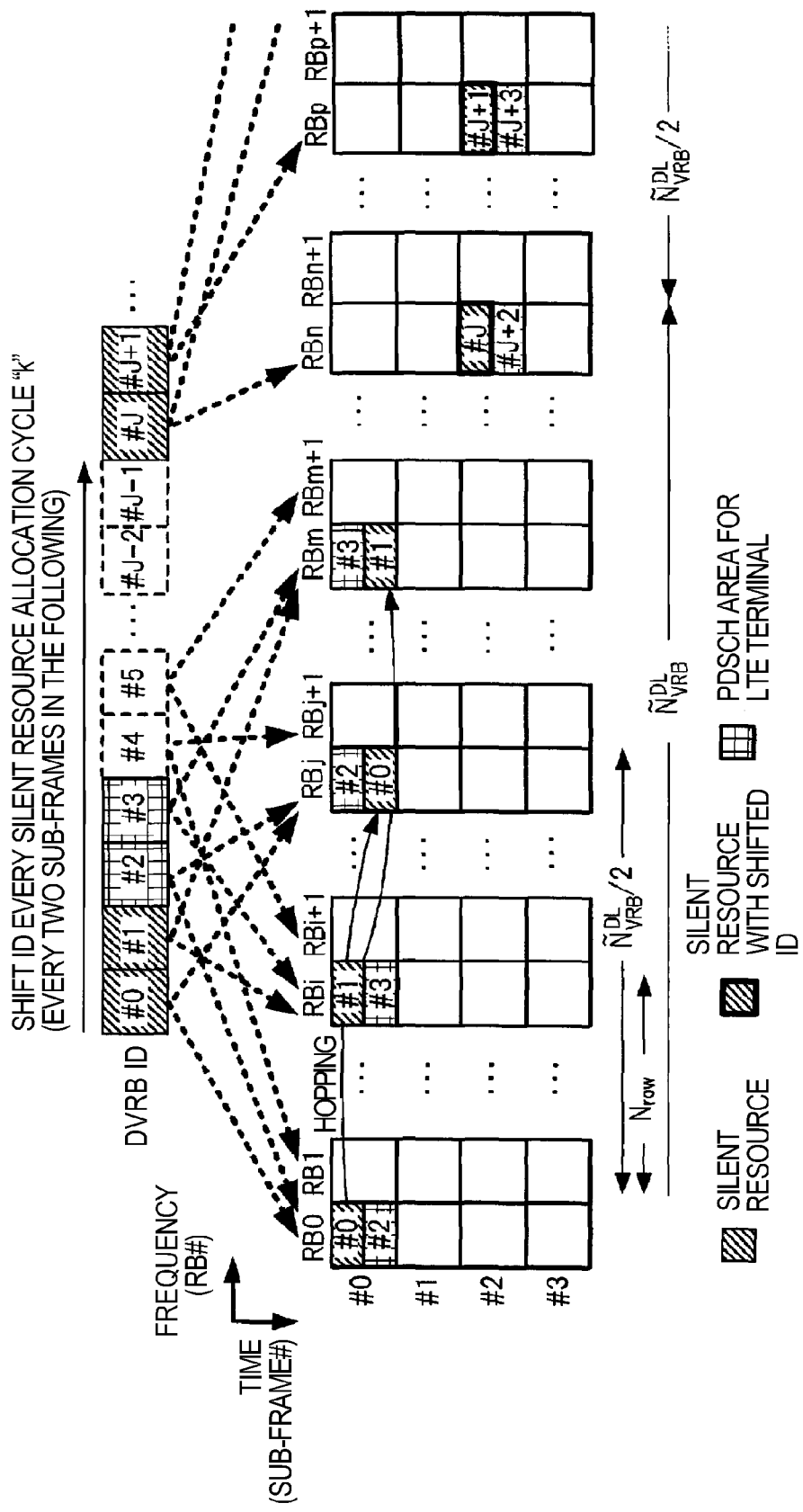
FIG. 7 is a diagram showing a configuration allocation of silent resources in a third embodiment.

A third embodiment shows still another example of the silent resource allocation method described in connection with the first embodiment. FIG. 7 is a diagram showing a configuration allocation of silent resources of the third embodiment. The third embodiment is directed toward an example allocation of silent resources achieved, as in the case of the first and second embodiments, on the assumption that a silent resource is allocated every "k" sub-frames (e.g., every two alternate sub-frames) and that silent resources are allocated within a range from $N^{-DL}_{VRB} \leq J < N^{DL}_{VRB}$. A specific example shown in FIG. 7 shows an allocation of silent resources achieved at k=2 (transmission performed at every two sub-frames) and J=$N^{-DL}_{VRB}$.

In this case, a "silent resource allocation DVRB ID" as well as a "silent resource allocation cycle k" and a "shift amount J" are reported from the transmission device to the reception device as a silent resource allocation notice based on the control information including silent resource setting information. Specifics of the "silent resource allocation DVRB ID" include a bitmap having a bit width $N^{-DL}_{VRB}$ corresponding to respective resources DVRB #0 to #$N^{-DL}_{VRB}$-1 of the resource IDs of the DVRB resources. FIG. 8 is a diagram showing an example bitmap for reporting a silent resource allocation DVRB ID of the third embodiment. The illustrated example shows a bitmap of silent resource setting information employed when silent resources are allocated at #0, #1, #8, #9, . . . .

By means of the silent resource setting information, both the transmission device and the reception device are construed as having a silent resource allocation in which the DVRB ID is shifted by J every two sub-frames that is a transmission timing of each of silent resources. More specifically, the transmission device and the reception device operate on the assumption that a silent resource allocation is allocated, for each silent resource transmission timing, to a DVRB ID made by addition of J to a DVRB ID given "one" in FIG. 8. When exceeded $N^{DL}_{VRB}$ as a result of occurrence of a shift, the DVRB ID is taken as a residual caused by $N^{DL}_{VRB}$.

By means of a configuration using such a silent resource allocation method, silent resources can be allocated over a wider area within the system bandwidth while an amount of signaling of the silent resource allocation DVRB ID reported from the transmission device to the reception device is maintained at a low level (in this case $N^{-DL}_{VRB}$ bits). In particular, when cells to be measured are preferentially allocated specific frequency resources #0 to # $N^{-DL}_{VRB}-1$ through operation like cooperative control, effective measurement of inter-cell interference can be carried out. Further, in this case, measurement of inter-cell interference using different resources for respective transmission sub-frames becomes possible, and average measurement of inter-cell interference can be performed even when an unbalance exists in a traffic status of another cell, a status of resource allocation, and others. Since a density of silent resource in one transmission sub-frame can be reduced, an additional reduction in restrictions on scheduling and prevention of degradation of demodulation performance become possible, so that throughput degradation can be prevented.

(Fourth Embodiment)

Figure 9:
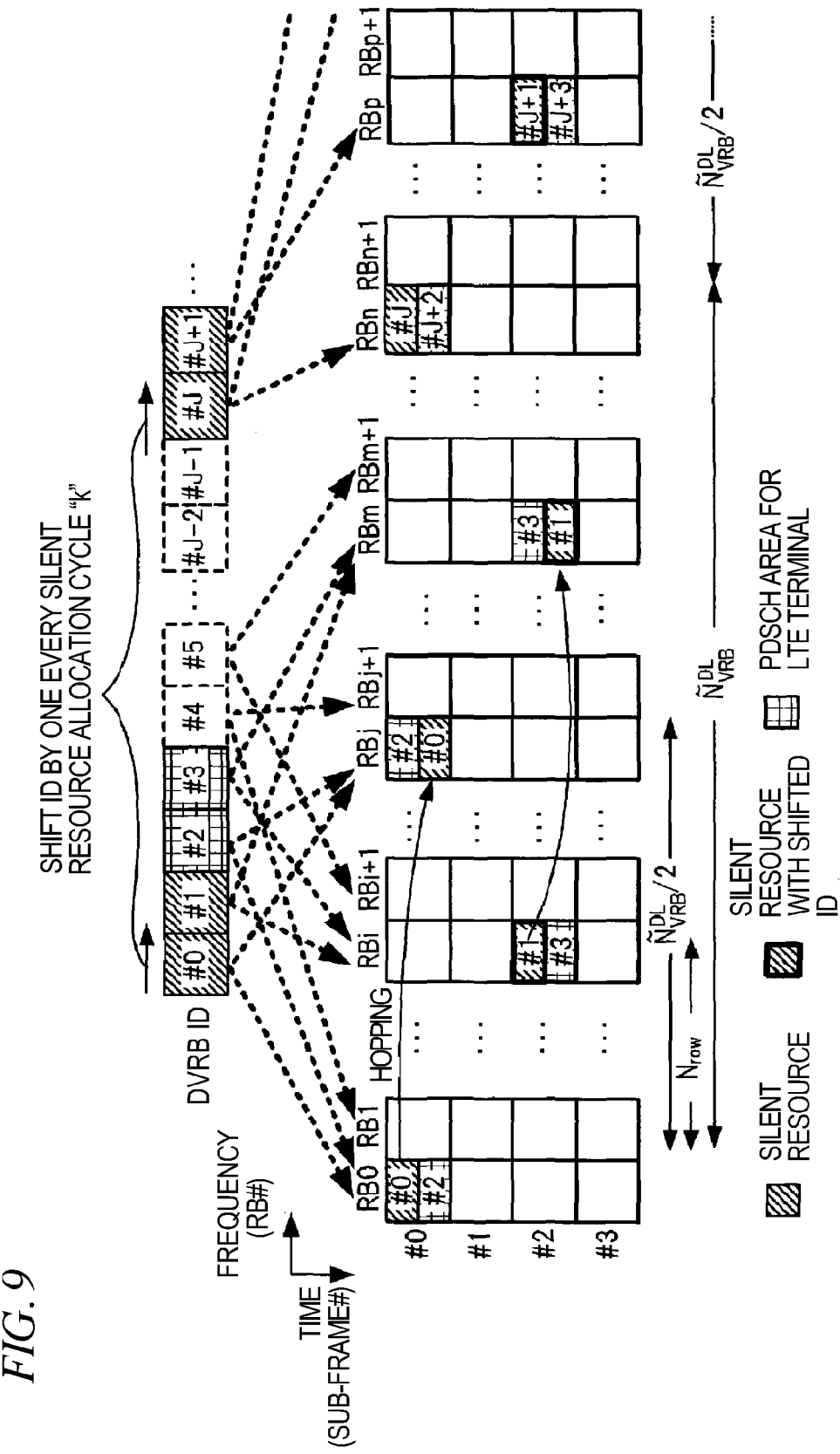
FIG. 9 is a diagram showing a configuration allocation of silent resources in a fourth embodiment.
Figure 11:
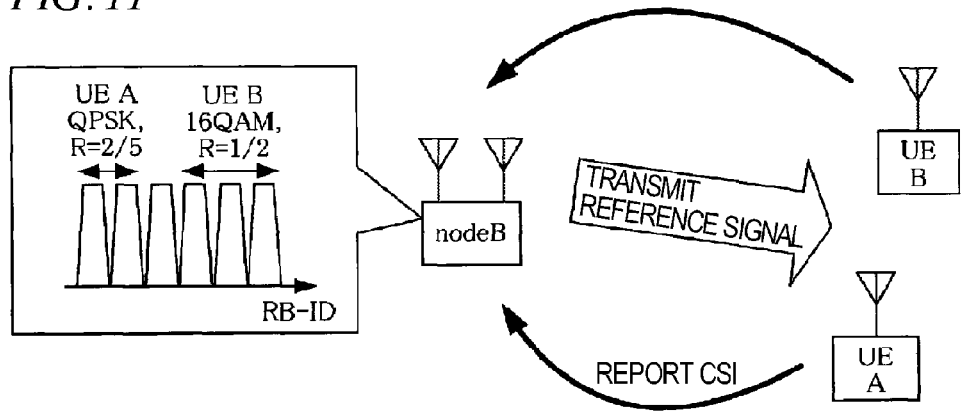
FIG. 11 is an explanatory operation diagram schematically showing CSI reporting operation performed when adaptive modulation and frequency scheduling are carried out.
Figure 12:
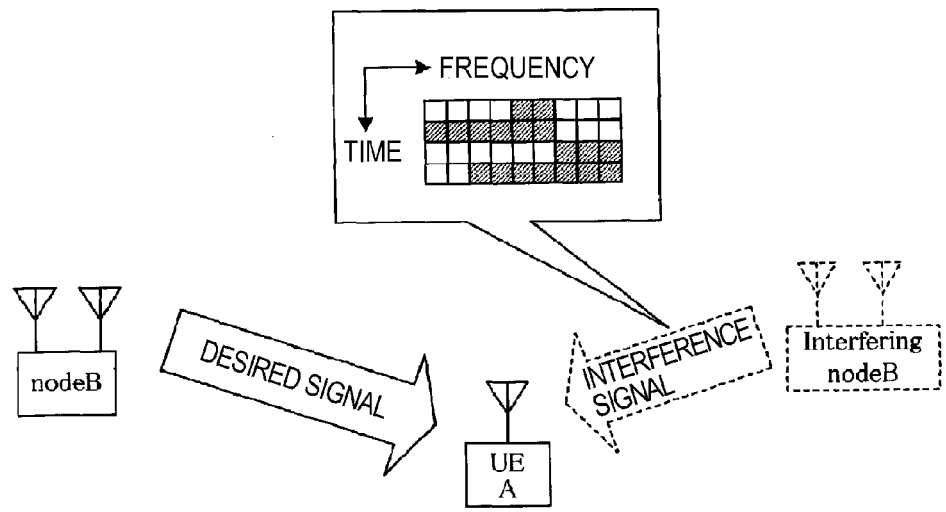
FIG. 12 is an explanatory operation diagram schematically showing an inter-cell interference and a traffic status of another cell.
Figure 13:
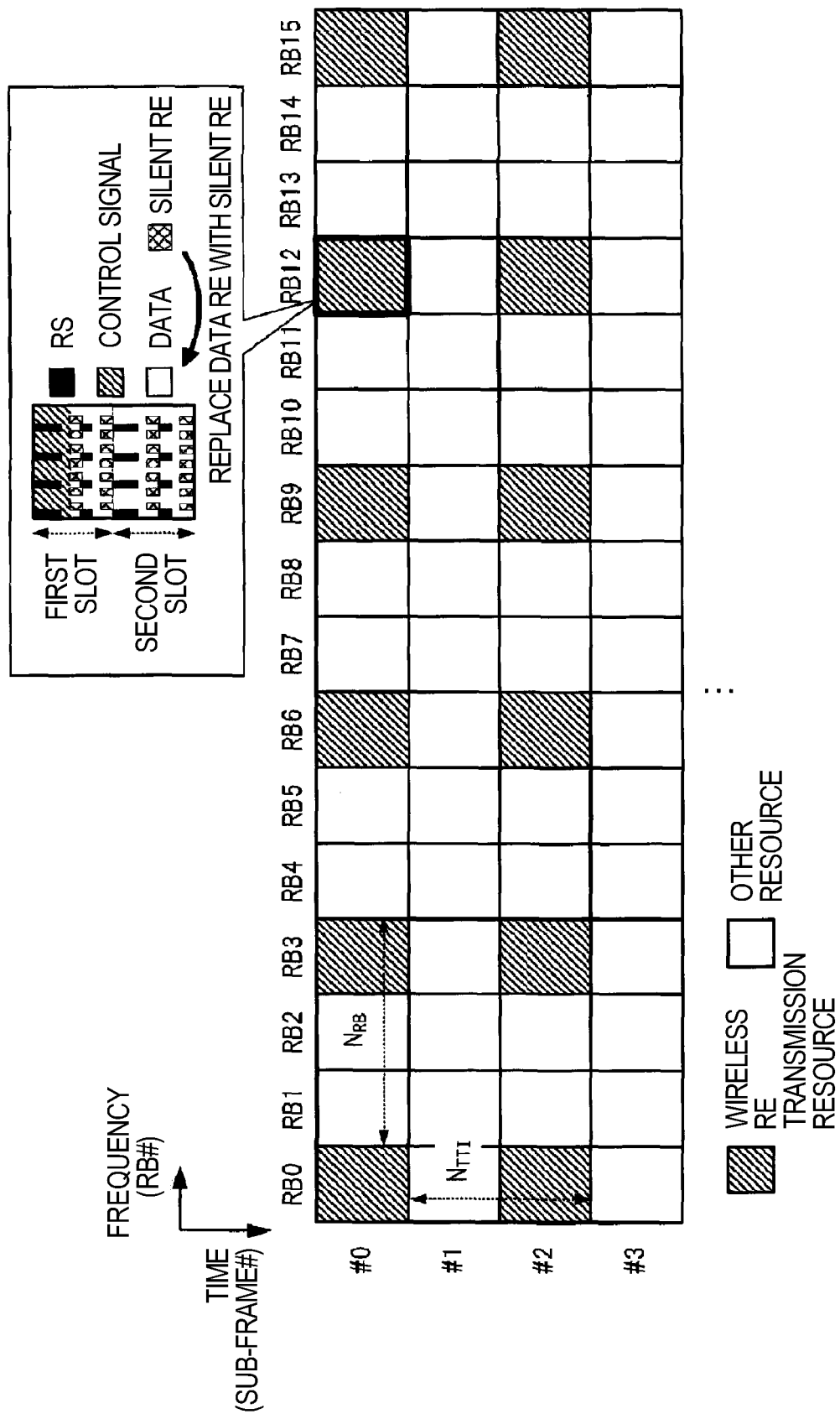
FIG. 13 is a diagram showing an example allocation of silent resources.

A fourth embodiment shows an example modification of the silent resource allocation method of the third embodiment. FIG. 9 is a diagram showing a configuration allocation of silent resources of the fourth embodiment. The fourth embodiment is an example silent resource allocation achieved at $J \le N_{col}$. The specific example shown in FIG. 9 illustrates an allocation of silent resources achieved at k=2 (transmission performed every two sub-frames and J=1).

In this case, as in the case with the third embodiment, in addition to sending the "silent resource allocation cycle k" and the "shift amount J," the transmission device reports the "silent resource allocation DVRB ID" to the reception device as a silent resource allocation notice based on control information including the silent resource setting information. Specifics of the "silent resource allocation DVRB ID" include a bitmap having a bit width $N^{DL}_{VRB}/N_{col}$ corresponding to each of resources DVRB #0 to #($N^{DL}_{VRB}/N_{col}$)-1 of the resource IDs of the DVRB resources. FIG. 10 is a diagram showing an example bitmap for reporting a silent resource allocation DVRB ID of the fourth embodiment. The illustrated example shows a bitmap of silent resource setting information employed when silent resources are allocated at #0, #J/$N_{col}$, . . . .

By means of the silent resource setting information, both the transmission device and the reception device are construed as having a silent resource allocation in which the DVRB ID made by multiplying an DVRB ID given "one" in FIG. 10 by $N_{col}$ is shifted by J every two sub-frames that is a transmission timing of each of silent resources. When the shift amount exceeds $N_{col}$ as a result of repetition of the transmission timing, the DVRB ID is taken as a residual caused by $N_{col}$.

By means of a configuration using such a silent resource allocation method, a quantization particle size is roughened in order to reduce an amount of signaling occurred when a notice is sent from the transmission device to the reception device, whereas the influence of quantization can be avoided by means of transmission performed a plurality of times. In particular, when there are a small number of reception devices belonging to a cell to be measured and when allocation concentrates on high quality frequency resources observed in the reception devices, effect measurement of inter-cell interference can be performed. In this case, since the density of silent resources in one transmission sub-frame can be reduced, an additional reduction in restrictions on scheduling and prevention of degradation of demodulation performance can be accomplished, so that throughput degradation can be prevented. Moreover, silent resources can be allocated over a wider area within the system bandwidth, and an allocation density of silent resources in a plurality of transmission sub-frames can be thickened. Accordingly, an averaging effect yielded during measurement of inter-cell interference can be enhanced.

The present invention is also scheduled to be subjected to various alterations or applications conceived by those who are versed in the art, without departing the spirit and scope of the present invention, based on descriptions of the specification and the well known techniques. The alterations or applications shall also fall within a range where protection is sought. Further, the constituent elements of the embodiments can be also arbitrarily combined with each other within the spirit of the present invention.

Although the present embodiments have described the invention by reference to the antenna, the present invention can likewise be applied even to an antenna port. The antenna port designates a logical antenna made up of one or a plurality of physical antennas. Specifically, the antenna port does not always designate one physical antenna but may often designate an arrayed antenna made up of a plurality of antennas, or the like. For instance, the number of physical antennas making up an antenna port is not defined in LTE, and a base station is defined in LTE as a minimum unit capable of transmitting different reference signals. Further, the antenna port is sometimes defined as a minimum unit that multiplies a weight on a precoding vector.

Although the present invention has been described in the embodiments by means of taking, as an example, the case where the present invention is built from hardware, the present invention can be also implemented by means of software.

The respective functional blocks used in description of the respective embodiments are implemented by an LSI that is typically an integrated circuit. The functional blocks can be also separately integrated as one chip. Alternatively, the functional blocks can be also integrated into one chip so as to include some or all of the functional blocks. The functional blocks are referred to herein as an LSI, the functional blocks are sometimes referred to as an IC, a system LSI, a super LSI, or an ultra LSI depending on a degree of integration.

A technique for materializing an integrated circuit is not limited to the LSI, and integration can be also accomplished by means of a dedicated circuit or a general purpose processor. There can be also utilized an FPGA (Field Programmable Gate Array) that can be programmable after manufacture of an LSI and a reconfigurable processor that enables reconfiguration of connections and settings of circuit cells within an LSI.

Further, so long as a circuit integration technique replaceable with the LSI has emerged as a result of advancement of the semiconductor techniques or by means of another technique derived from the semiconductor techniques, the functional blocks can naturally be integrated by use of the technique. Adaptation of biotechnology, or the like, is probable.

The present patent application is based on Japanese Patent Application (No. 2010-072360) filed on Mar. 26, 2010, the contents of which are incorporated herein by reference in its entirety.

INDUSTRIAL APPLICABILITY

The present invention yields an advantage of the ability to avoid restrictions on scheduling, or the like, which would otherwise be caused by silent resources when the silent resources are allocated to measure inter-cell interference, and the ability to prevent throughput degradation. The present invention is useful as a wireless reception device, a wireless

REFERENCE SIGNS LIST 111a, 111b: ANTENNA
112a, 112b: RECEIVING RF SECTION
113: CHANNEL ESTIMATOR
115: MIMO DEMODULATOR
116: DECODER
117: CRC CHECKER
118: FEEDBACK INFORMATION GENERATOR
119: ENCODER
120: MULTIPLEXER
121: TRANSMISSION RF SECTION
122: CONTROL SIGNAL DEMODULATOR
124: INTER-CELL INTERFERENCE MEASUREMENT SECTION
125: CSI MEASUREMENT SECTION
231m, 231n: TERMINAL-ORIENTED SIGNAL PROCESSING UNIT
232: ENCODER/MODULATOR
233: PRECODING SECTION
234a to 234d: TRANSMISSION RF SECTION
235a to 235d: ANTENNA
236: SCHEDULER
237: SILENT-RESOURCE-ORIENTED DVRB SETTING SECTION
239: REFERENCE SIGNAL GENERATOR
241: RECEIVING RF SECTION
242: SEPARATOR
243: DEMODULATOR/DECODER
244: CRC CHECKER
245: FEEDBACK INFORMATION DEMODULATOR
246: CONTROL INFORMATION GENERATOR

The invention claimed is:

1. A wireless reception device, comprising:
a resource information acquisition section that is configured to acquire silent resource setting information showing that a silent resource which indicates that no signals are allocated in a predetermined resource among distributed resources in which a resource unit defined in a frequency-time domain is divided along a time direction and distributed at a predetermined frequency interval;
a receiver that is configured to receive a signal including the distributed resources in which the silent resource is allocated; and
an inter-cell interference measurement section that is configured to measure an inter-cell interference pertaining to an amount of interference affected by another cell based on the silent resource setting information and by use of the silent resource allocated in the distributed resources, wherein
there are employed, as the distributed resources, resources in which a resource unit defined in the frequency-time domain is divided into a first half slot and a last half slot along a time direction and the first half slot and the last half slot are hopped in a frequency direction and distributed at a predetermined frequency interval, and
the inter-cell interference measurement section measures the inter-cell interference by use of the silent resource allocated in a part of the distributed resources.

2. The wireless reception device according to claim 1, wherein
the wireless reception device can cope with, as a wireless communication system, a first communication system to which LTE (Long Term Evolution) is applied and a second communication system to which LTE-A (LTE-Advanced) is applied,
DVRB (Distributed Virtual Resource Block) resources corresponding to distributed resources as defined by LTE are utilized as the distributed resources.

3. The wireless reception device according to claim 2, wherein
the inter-cell interference measurement section measures the inter-cell interference by use of the silent resource among the DVRB resources, the silent resource being allocated in a resource having a specific resource ID.

4. The wireless reception device according to claim 1, wherein,
when the silent resources are distributed at a predetermined frequency interval in the distributed resources, the inter-cell interference measurement section measures the inter-cell interference by use of the silent resources in which a predetermined unit of distribution is repeatedly allocated in a frequency direction.

5. The wireless reception device according to claim 1, wherein,
when the silent resources are distributed at a predetermined frequency interval in the distributed resources, the inter-cell interference measurement section measures the inter-cell interference by use of the silent resources in which a predetermined unit of distribution is allocated while shifted by a predetermined amount in a frequency direction at each transmission timing.

6. A wireless transmission device, comprising:
a resource setting section that is configured to perform a resource setting so as to allocate a silent resource which indicates that no signals are allocated in a predetermined resource among distributed resources in which a resource unit defined in a frequency-time domain is divided along a time direction and distributed at a predetermined frequency interval, and to generate silent resource setting information showing an allocation of the silent resource; and
a transmitter that is configured to transmit a signal including the distributed resources in which the silent resource is allocated and the silent resource setting information, wherein
there are employed, as the distributed resources, resources in which a resource unit defined in the frequency-time domain is divided into a first half slot and a last half slot along a time direction and the first half slot and the last half slot are hopped along a frequency direction and distributed at a predetermined frequency interval, and
the resource setting section performs the resource setting by which the silent resource is allocated in a part of the distributed resources.

7. The wireless transmission device according to claim 6, wherein
the wireless transmission device enables establishment of communication in a first communication system to which LTE (Long Term Evolution) is applied and a second communication system to which LTE-A (LTE-Advanced) is applied;
DVRB (Distributed Virtual Resource Block) resources corresponding to distributed resources defined by LTE are utilized as the distributed resources.

8. The wireless transmission device according to claim 7, wherein
data to be transmitted to a wireless reception device compatible with the first communication system are allocated to a part of the DVRB resources where the silent resource is not allocated.

9. The wireless transmission device according to claim 7, wherein
the resource setting section performs the resource setting by which the silent resource is allocated in a resource having a specific resource ID among the DVRB resources.

10. The wireless transmission device according to claim 6, wherein,
when the silent resources are distributed at a predetermined frequency interval in the distributed resources, the resource setting section performs the resource setting by which the silent resources are allocated in a state where a predetermined unit of distribution is repeatedly allocated along a frequency direction.

11. The wireless transmission device according to claim 6, wherein,
when the silent resources are distributed at a predetermined frequency interval in the distributed resources, the resource setting section performs the resource setting by which the silent resources are allocated in a state where a predetermined unit of distribution is allocated while shifted by a predetermined amount in a frequency direction at each transmission timing.

12. A wireless communication method, comprising:
acquiring silent resource setting information showing that a silent resource which indicates that no signals are allocated in a predetermined resource among distributed resources in which a resource unit defined in a frequency-time domain is divided along a time direction and distributed at a predetermined frequency interval;
receiving a signal including the distributed resources in which the silent resource is allocated; and
measuring an inter-cell interference pertaining to an amount of interference affected by another cell based on the silent resource setting information and by use of the silent resource allocated in the distributed resources, wherein
there are employed, as the distributed resources, resources in which a resource unit defined in the frequency-time domain is divided into a first half slot and a last half slot along a time direction and the first half slot and the last half slot are hopped in a frequency direction and distributed at a predetermined frequency interval, and
the inter-cell interference measurement section measures the inter-cell interference by use of the silent resource allocated in a part of the distributed resources.

13. A wireless communication method, comprising:
performing a resource setting so as to allocate a silent resource which indicates that no signals are allocated in a predetermined resource among distributed resources in which a resource unit defined in a frequency-time domain is divided along a time direction and distributed at a predetermined frequency interval, and generating silent resource setting information showing an allocation of the silent resource; and
transmitting a signal including the distributed resources in which the silent resource is allocated and the silent resource setting information, wherein
there are employed, as the distributed resources, resources in which a resource unit defined in the frequency-time domain is divided into a first half slot and a last half slot along a time direction and the first half slot and the last half slot are hopped along a frequency direction and distributed at a predetermined frequency interval, and
the resource setting section performs the resource setting by which the silent resource is allocated in a part of the distributed resources.

* * * * *